Sept. 28, 1971  E. R. RISH ET AL  3,608,113

PORTABLE LATHE, TOOL AND DIE DEVICE

Filed Sept. 4, 1969  5 Sheets-Sheet 1

INVENTORS
ERVIN R. RISH
F. DARELL DAVIS

BY John Kirkland Smith Jr.
ATTORNEY

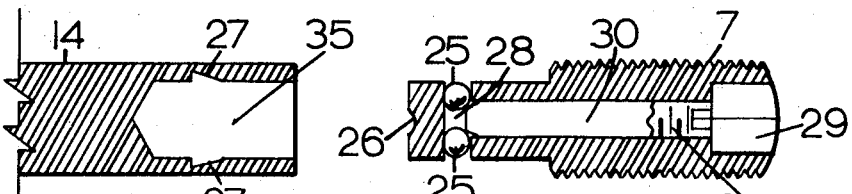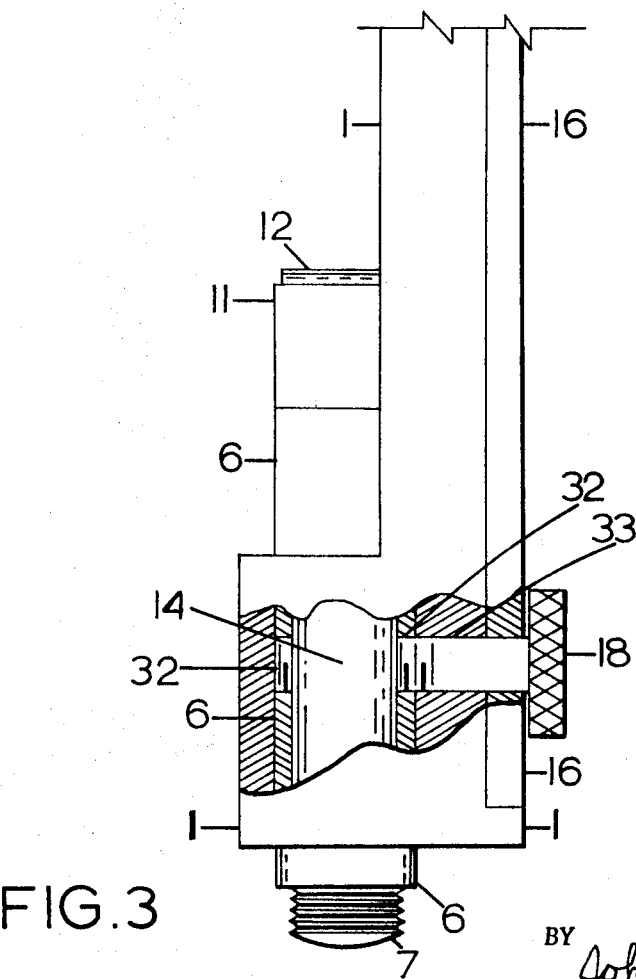

Sept. 28, 1971　　　E. R. RISH ET AL　　　3,608,113
PORTABLE LATHE, TOOL AND DIE DEVICE
Filed Sept. 4, 1969　　　　　　　　　　　5 Sheets-Sheet 4
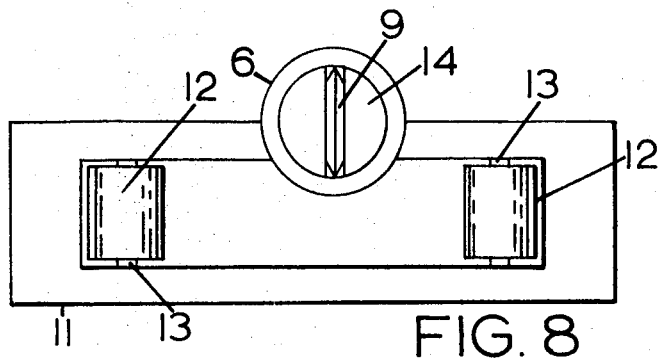
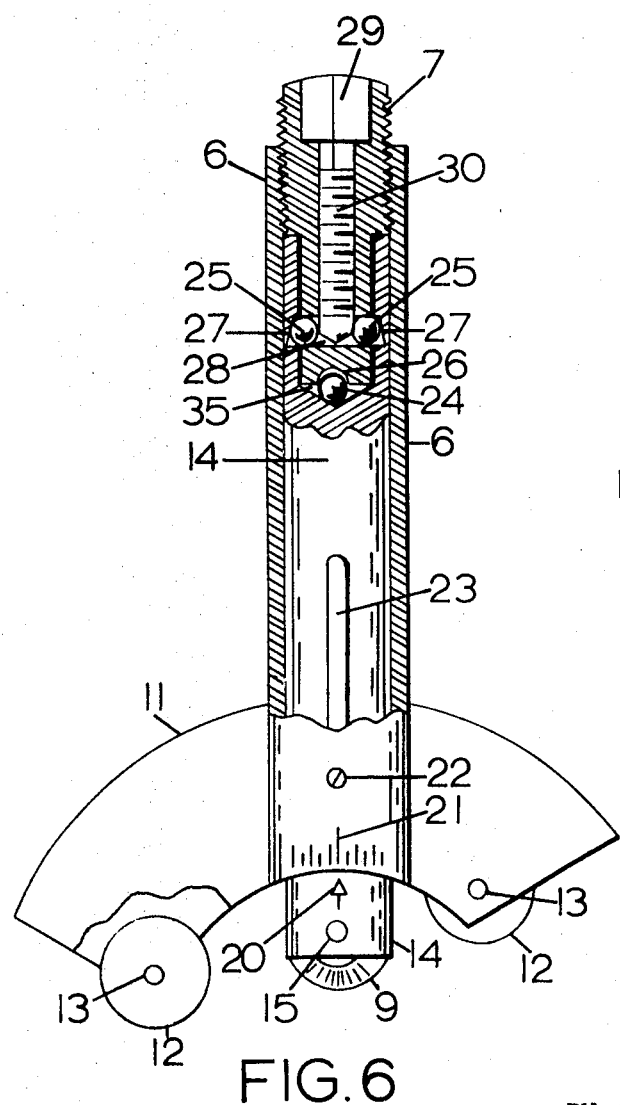
INVENTORS
ERVIN R. RISH
F. DARELL DAVIS
ATTORNEY Sept. 28, 1971  E. R. RISH ET AL  3,608,113
PORTABLE LATHE, TOOL AND DIE DEVICE
Filed Sept. 4, 1969  5 Sheets-Sheet 5

INVENTORS
ERVIN R. RISH
F. DARELL DAVIS

BY John Kirkland Smith Jr
ATTORNEY

United States Patent Office 3,608,113
Patented Sept. 28, 1971

3,608,113
PORTABLE LATHE, TOOL AND DIE DEVICE
Ervin R. Rish, 1815 8th St., and Fredrick Darell Davis, 406 Rocky Lane, both of Cayce, S.C. 29033
Filed Sept. 4, 1969, Ser. No. 855,095
Int. Cl. B23g *5/00, 5/08, 1/28*
U.S. Cl. 10—110                                       4 Claims

ABSTRACT OF THE DISCLOSURE

A lathe, tool and die device comprising a primary or carrier ring and nested therein a cam ring whereby the cam ring and the carrier ring can be relatively rotated. The carrier ring further provides a plurality of angularly spaced work bosses, and each of said work bosses is adapted to support a working tool so that when the carrier ring and cam ring are relatively rotated, the working tool holder and thereby the working tool may be converged or diverged about a surface upon which work is to be performed.

---

This invention pertains to a new and useful article of manufacture. More particularly, this invention has to do with restoring damaged threads.

DRAWINGS

FIG. 3 is an enlarged view of a section taken through the cam ring;

FIG. 4 is a partial view showing a portion of the tool holder of the tool adjusting means; and in particular showing the internal circumferential recess;

FIG. 5 is a view of the tool adjusting means showing the method of forcing the retaining balls into an internal circumferential recess;

FIG. 6 is an enlarged view of the tool guide device showing the relationship of the tool holder, the tool adjusting means, and the crescents;

FIG. 7 is a side view of the device of FIG. 6;

FIG. 8 is a bottom view showing the working tool and the disposition of the positioning rollers;

FIG. 1

Figure 1:
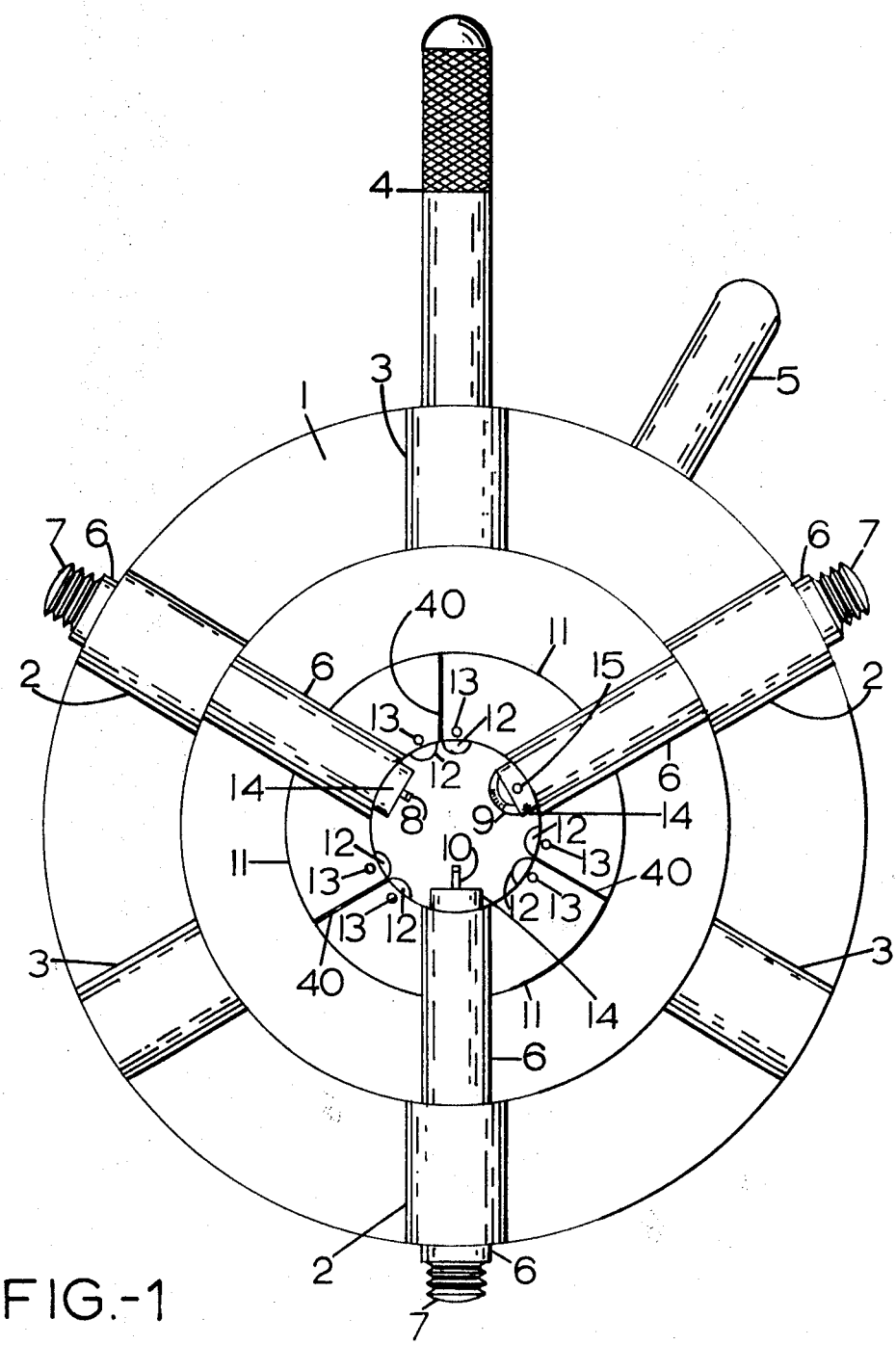
FIG. 1 is the obverse view of the tool and die device showing the principal working parts.

This figure shows an overall view of the invention wherein can be found carrier ring 1 having angularly spaced around the open face thereof a plurality of work bosses 2 and a plurality of angularly spaced handle bosses 3. Shown in one of the handle bosses 3 is a work handle 4 which is insertable selectively in any of the handle bosses 3 depending upon working space on a particular job. Fixed to a cam ring to be described in FIG. 2 will be found a cam ring handle 5. In each of the work bosses 2 is found a tool guide device 6 each having an associated tool adjusting means 7 at its outer end. On the opposite or inner end of tool guide device 6 can be found a particular working tool, and the case of FIG. 1 shows a lathe cutting tool 8, a cutting roller 9, and a die 10, each of which effects a distinct desired result, and each held in place by a tool holder 14. Near the inner end of each tool guide device 6 is found a guide crescent 11 which comprises angularly spaced rollers 12 retained in position by axles 13 so that when the crescent guides 11 are actuated toward a closed relationship to bring the desired tool or die 8, 9, 10 into engagement with the surface to be treated, the crescent guides 11 will come together at a junction 40; thus when the tool guide 6 is recessed into the work boss 2 the working tools or die 8, 9, 10 diverge whereupon a larger piece of work can be handled. In the case of the cutting roller 9, it must be adapted to rotate in order to effect the proper cutting therefore the cutting roller 9 is held into the tool holder 14 by means of a cutting roller axle 15.

FIG. 2

Figure 2:
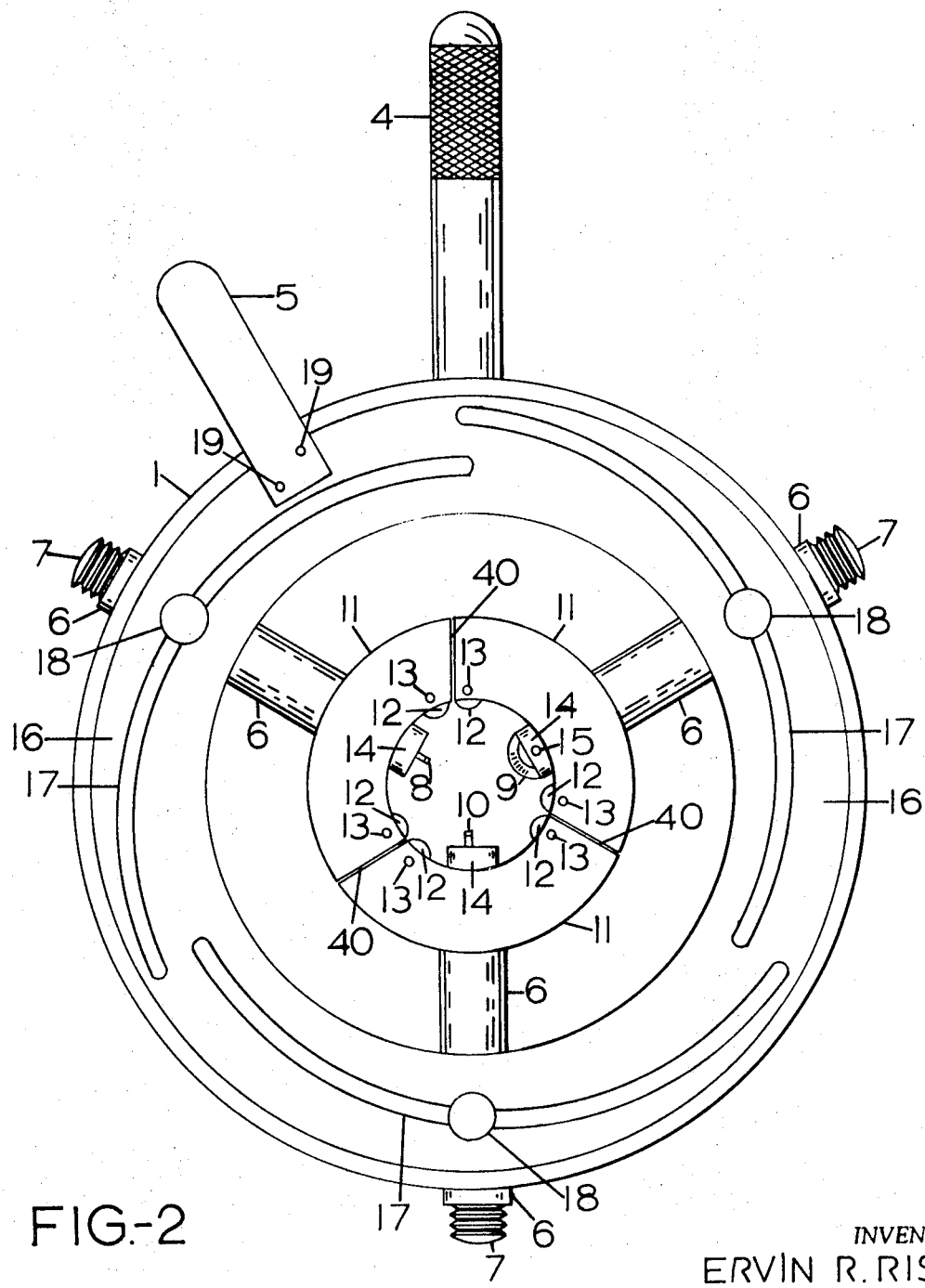
FIG. 2 is the reverse of the tool showing principally the cam ring and the cam slots.

FIG. 2 is the reverse side of the invention showing the carrier ring 1 with its associated work handle 4, the cam ring handle 5, the tool guide device 6 and the tool adjusting means 7. Further shown are a plurality of angularly spaced tool holders 14 each having one working tool consisting of a lathe cutting tool 8, a cutting roller 9, and a die 10 respectively. Also shown are the guide crescents 11 which come together at crescent junction 40 when the device is fully converged so as to work on the smallest surface possible. Also shown is the cutting roller axle 15 which allows the cutting roller 9 to be rotated.

When the invention is in use, rollers 12 on the inner periphery of guide crescent 11 engage the particular surface upon which the work is to be performed and each of the rollers 12 are adapted to roll on an associated roller axle 13.

Insofar as what is unique to FIG. 2 and not shown in FIG. 1, there is provided a cam ring 16 having a plurality of cam slots 17 in which ride a special shoulder bolt 18 which is fixed to tool guide device 6 and cam ring handle 5 is fixed to the cam ring 16 by means of handle attachment bolts 19. Thus it can be seen that in order to converge or diverge working tools 8, 9, 10 so as to accommodate different size work, for instance, all one has to do is grab cam ring handle 5 in his left hand and work handle 4 in his right hand, and increase or decrease the angular displacement therebetween so as to cause special shoulder bolt 18 to travel along its respective cam slot 17 thereby causing crescents 11 to diverge or converge. Shoulder bolts 18 are tightened after the work surface is engaged by the converging tools 8, 9 and 10 to maintain said tools in their work engaging position.

FIG. 3

FIG. 3 shows how special shoulder bolt 18 passes through cam ring 16, through carrier ring slot 33 and locks in place the carrier ring 1, cam ring 16, guide device 6 and tool holder 14 to hold them in a fixed position relative to each other. Also shown is the tool adjusting means 7 and a roller 12 which roller 12 is adapted for rotation in crescent 11. Holes 32 are diametrically opposed by virtue of being bored in the wall of guide device 6.

FIG. 4

FIG. 4 is a partial section view of tool holder 14 having a longitudinal bore 35 which longitudinal bore 35 has an internal circumferential recess 27.

FIG. 5

FIG. 5 is a view of tool adjusting means 7 having an Allen set screw 30 located in a longitudinal bore therein, said Allen set screw 30 containing screw threads 34 thereon. Upon activation of Allen set screw 30, said screw 30 can be forced to ride longitudinally in the length of the tool adjusting means 7 to cause retaining balls 25 to be forced radially outwardly or inwardly of ball retaining bore 28. The closed end of tool adjusting means 7 has a ball recess 26 thereon. Thus it can be seen that when tool adjusting means 7 is placed in the bore 35 of FIG. 4 that upon adjusting Allen set screw 30 the retaining balls 25 of FIG. 5 will be forced into or out of internal circumferential recess 27 of the tool holder 14 thereby locking the tool adjusting means 7 and tool holder 14. Shown at the outer end of the longitudinal bore is hex screw recess 29.

FIG. 6

FIG. 6 is a front view of guide crescent 11 and shows roller 12 on each of the oppositely disposed ends of said guide crescent 11, rollers 12 being adapted to rotate around an axle 13 and also shows where axles 13 are fixed to guide crescent 11. Spaced between the rollers 12 is shown tool holder 14 in which is placed a cutting roller 9 adapted for rotation about cutting roller axle 15. On the tool holder 14 is located an arrow 20 and on guide crescent 11 an associated line of gradations 21 which together form an index to indicate the alignment or desired variations from the alignment of the cutting roller 9 and guide crescent 11. Dog point screw 22 projects through guide crescent 11 and is adapted to engage guide slot 23 in tool holder 14. It has been shown that tool holder 14 projects through the longitudinal bore of tool guide device 6 and that tool adjusting means 7 projects downwardly from the other end to engage tool holder 14. Tool guide device 6 at its upper end is provided with internal grooves and tool adjusting means 7 is provided with associated external grooves whereby tool adjusting means 7 can be actuated by means of hex recess 29 so that tool adjusting means 7 will screw into or out of tool guide device 6. There are external threads on Allen set-screw 30 whereby actuating hexagonal set screw 30 inwardly will cause retaining balls 25 to be forced into internal circumferential recess 27. At the bottom closed end of tool adjusting means 7 is found a load distributing ball 24 which rests in the bottom of longitudinal bore 35 in tool holder 14 and is held in place by recess 26.

In some applications it becomes desirable to set a lead. This is accomplished by loosening dog point screw 22, twisting tool holder 14 right or left as the case may be, setting arrow on gradation mark desired, then tightening dog point screw back in slot 23 to make tool holder 14 immovable. In some cases it may be desirable to loosen dog point screw 22 and place a hex wrench in hex recess 29 to lengthen or shorten tool holder 14 to bring the tool into contact with work; and this is done by loosening dog point screw 22, placing hex wrench in hex recess 29 and turning tool adjusting means to the desired position then dog point screw 22 is tightened causing tool holder 14 and guide crescent 11 to be relatively fixed.

FIG. 7

FIG. 7 is a cross-section of guide crescent 11 and shows tool holder 14 which is inserted in the longitudinal bore 35 of tool guide device 6 and is adjustable longitudinally by tool adjusting means 7. Shown on tool guide device 6 are four radially disposed threaded bores 32 spaced longitudinally at a distance so as to allow special shoulder bolt 18 to be removed and re-inserted for any different combinations so as to allow cam ring 16 to close tool guide device 6 in order to cause the crescent guide 11 and the cutting roller 9 to be extended fully. Also shown is guide crescent 11 having thereon roller 12. At the working end of tool holder 14 is shown a cutting roller 9.

The reason for radially disposed threaded bores 32 is to permit rotation of FIG. 7 180 degrees; whereby in FIG. 2 the heretofore unused travel of cam slot 17 will be utilized.

FIG. 8

FIG. 8 is a bottom view of the guide crescent 11 and shows the divergently disposed rollers 12 adapted to roll on axles 13 which are fixed to guide crescent 11. Tool holder 14 is shown in a position between rollers 12. Cutting roller 9 is shown disposed in tool holder 14. It should be noted that rollers 12 are not symmetrically disposed with respect to the working tool, in this case a cutting roller 9. This is done so that the tool in operation will not fall into splines, keyways, etc.

FIG. 9

Figures 9, 10, 11:
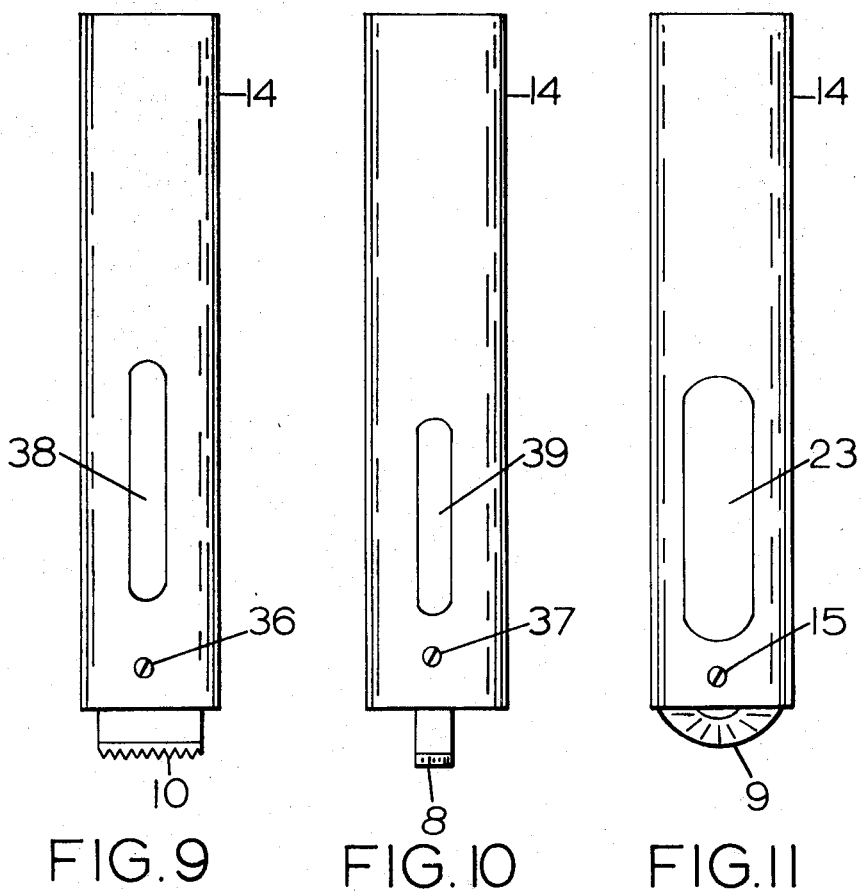
FIG. 9 is a view of one tool holder treatment showing the working tool to be a die.
FIG. 10 is a view of a tool holder treatment, showing the working tool to be a cutting edge.
FIG. 11 is a view of one tool holder treatment showing the working tool to be a cutting roller, and also showing the enlarged treatment of the adjusting slots.

FIG. 9 shows one of the tools that can be placed in the device to do a particular job. Specifically shown is a die 10 held in the tool holder 14 by means of die holding screw 36. The die 10 is standard equipment and as such is not part of our invention except insofar as the use of the die is concerned. Running longitudinally along the tool holder 14 is a milled guide slot 38 to hold the die 10 motionless with respect to its associated tool guide device, allowing in and out travel of tool holder 14 while maintaining die 10 in a fixed position.

FIG. 10

FIG. 10 is another species of tool that may be used, and in particular shows a lathe cutting tool 8 held in place in tool holder 14 by means of lathe tool holding screw 37. In order to hold the lathe cutting tool motionless, there is provided a longitudinally extending guide slot 39.

FIG. 11

FIG. 11 is a view of a third working tool, and in this particular case is a cutting roller 9 held in tool holder 14 by means of cutting roller axle 15 about which cutting roller 9 is adapted to rotate. A guide slot 23 is provided and it should be noted that it is wider than slots 38, 39 of FIGS. 9 and 10 respectively to allow a slight angular twisting such as ¼ rotation of the tool holder 14 so that cutting roller 9 will provide a lead for other tools in other work holders spaced circumferentially around the tool. Working tool 9 (cutting roller) will be rendered motionless with respect to the set of the lead.

For example, on most machinery such as crawler tractors, trucks, buses, etc. when a wheel bearing is burned out, the spindle, axle, etc. usually become swollen from the heat. By using our invention, the axle or spindle can be turned down to original diameters and new threads cut by one of three methods, without the cost incurred by conventional methods now used involving removing the spindle or axle from machine and sending it to a machine shop. This operation normally takes by conventional methods two to three days, down time for equipment, but with our invention it can be done in one or two hours in the field, roadside, or shop, as the case may be.

DESCRIPTION OF VARIOUS CUTTING TOOLS EMPLOYED BY OUR INVENTION (1) The lathe cutting tool This tool can do various jobs such as turning down of shafts to different diameters, shaping and turning of different surfaces. It also can cut threads, restore threads by employing the roller in combination with this tool to supply the lead. The lathe tool can also be supplied a lead by employed a fine thread die and the die tool holder. This lathe tool can also cut pipe, metal, etc. in two.

In the case where it may be necessary to remove old threads for reasons of rusting or extensive damage, it is possible by means of incorporating the lathe cutting tool with the die plate to cut away old threads and replace new threads in one operation. This is done by rotating die plate holder 180°, thereby placing it behind lathe cutting tool. All tool holding devices and tool holders can be rotated 180° giving more versatility in methods of operation.

DISCUSSION OF VARIOUS PROCESS APPLICATIONS

This tool had been designed primarily, but not exclusively, to restore damaged threads in such places as truck axle housings, trailer axles, sprocket hubs, all without removing the parts from the machine. Heretofore, it has been necessary to remove parts and strip down to the point that they could be placed on an engine lathe to restore threads. In some cases, such as hitchpins on scrapers and center pins on cranes and shovels, the parts involved are too large and heavy to be handled by but very few machine shops in the country. With our invention, the job can be done without removing parts from machines, in most cases in less than an hour. Since it is not necessary to remove parts from the vehicle, the job can be done in the field or on the roadside using our invention.

In damaged threads on the center pin of a crane or shovel, in most cases the center pin is an integral part of the base casting and cannot be removed from the base; since on some machines this base casting can weigh several tons and may be ten feet or more in diameter, it is readily apparent that it can be quite a problem to salvage threads by conventional methods. Our invention has been designed to handle this job in the field without the problem and expense of disassembling of the entire crane, plus expenses incurred in shipping parts to a machine shop equipped to handle this job. On most heavy equipment today such as crawler tractors, motor graders, scrapers, front-end loaders, etc., we find planetary drives on all pulling wheels. On most planetary setups, the wheels, drive sprockets, etc. are mounted on tapered bearings which are held in place and adjusted by a nut which screws onto a threaded housing. In most cases this housing has splines and/or keyways cut to hold a stationary member of the planetary gear train, which means that threads which carry the adjusting nut have to be cut over the splines and keyways. Our invention has a series of rollers so spaced at uneven number of degrees apart, which allows the cutting tool in use to ride over the splines or keyways enabling us to use either the thread die plate, the thread roller, or the lath cutting tool as needed to restore damaged threads without the tool in use falling into said splines or keyways.

Our invention can also cut new threads by means of three methods:

Method I.—By engaging roller at an angle to give correct lead for number of threads per inch, the lathe tool ground to 60° is then brought into the work. Then by rotating our invention, it is therefore possible to cut any number of threads per inch by this method. The lathe tool can also be used to straighten or repair damaged threads on a shaft, bolt, etc.

Method II.—The die plates which can be interchanged in the die tool holder can be used for straightening of old threads, cutting of new threads, cutting and straightening of pipe threads, etc.

Method III.—The thread roller can be used to restore threads by rolling and displacing of metals into original position, without loss of said metal such as in scraping away of metals by a die plate.

By these three methods, it becomes evident that our invention is an invaluable device for straightening, restoring or cutting of threads.

(2) The thread die tool

This tool can cut new threads, straighten old threads or do any of the things now done with thread dies with the convenience of having only to change the die for the number of threads per inch desired.

(3) The roller tool

This tool can roll thread back into its original shape without loss of metal, it also can be used to cut pipe or other material. It is also employed to supply lead to lathe cutting tool by dialing an angle of lead desired.

We claim:
1. In a device of the type described and in combination:
   a carrier ring,
   a cam ring nested in and adapted to rotate about said carrier ring,
   a tool guide device of tubular structure adapted to be longitudinally adjustable with respect to said carrier ring,
   a plurality of work bosses angularly spaced on the inner surface of said carrier ring, a tool guide device positioned in each of said work bosses,
   a tool holder fixed within the longitudinal center of said tool guide device,
   a working tool in the inner end of said tool holder,
   a tool adjusting means located in the outer end of said tool guide device,
   a plurality of cam slots in said cam ring,
   a shoulder bolt passing through said cam slots of said cam ring and carrier ring and being fastened to a tool guide device whereby said tool guide device, tool holder, and working tool are radially moveable upon rotation of said cam ring, and may be adjustably positioned in any desired radial position by tightening said bolt on said cam ring.
   guide crescents bisected by said tool holder, one bifurcation of each crescent side being longer than its oppositely associated bifurcation,
   a roller on the internal surface of each of said bifurcations adapted to engage the circular surface upon which work is to be effected, said rollers being angularly spaced on each of said crescents at different distances from the longitudinal axis of the tool holder, whereby said working tool will override depressions in the working surface,
   a partial longitudinal bore in said tool adjusting means,
   an internal circumferential recess in said partial longitudinal bore,
   an Allen-set screw having a pointed inner end being disposed longitudinally of said tool adjusting means so as to be longitudinally adjustable,
   a pair of retaining balls disposed about the pointed inner end of said Allen-set screw, so as to be radially positioned with respect to said Allen-set screw, thereby being forced into said internal circumferential recess,
   a load distributing ball situated in the bottom of said partial longitudinal bore, said tool adjusting means being adapted to rest on said load distributing ball,
   a longitudinal guide slot in each of said tool holders and a dog point screw mounted in each of said guide crescents, said screw extending into said slots whereby said tool holder may be adjustably positioned relative to said tool guide and crescents, and index on the radially inward surfaces of at least one of said tool holders and said guide crescents for indicating the relative rotative position of said tool holder and said guide crescent,
   a cam ring handle fixed to said cam ring,
   a plurality of handle bosses angularly spaced about the inner surface of said carrier ring, and
   a work handle adapted to be inserted in turn in each of said work handle bosses.

2. In the apparatus of claim 1 wherein the working tool is a lathe cutting tool.

3. In the apparatus of claim 1 wherein the working tool is a cutting roller and the longitudinal guide slot is of sufficient width to allow the tool holder to be rotated to a desired angular position relative to said tool guide as indicated by said index and set in that position by tightening said dog point screw.

4. In the apparatus of claim 1 wherein the working tool is a die.

References Cited
UNITED STATES PATENTS

| | | | |
|---|---|---|---|
| 969,388 | 9/1910 | Miles | 10—101 |
| 1,154,424 | 9/1915 | Oakes | 10—122 |
| 1,244,996 | 10/1917 | Lovegrove | 10—121 |
| 1,506,027 | 8/1924 | O'Brein | 10—1.5 |
| 1,545,162 | 7/1925 | Nelson | 10—1.5 |
| 1,921,754 | 8/1933 | Hyde | 10—122 |
| 2,313,986 | 3/1943 | Brown | 10—101 |
| 2,388,790 | 11/1945 | Mackliet | 10—1.5 |
| 2,760,213 | 8/1956 | Bjalme | 10—122 |
| 1,017,403 | 2/1912 | Garbarino et al. | 10—116 |

CHARLES W. LANHAM, Primary Examiner

E. M. COMBS, Assistant Examiner

U.S. Cl. X.R.

10—121, 122